A. H. A. BOKELUND, DEC'D.
H. BOKELUND, ADMINISTRATOR.
BALL BEARING.
APPLICATION FILED MAY 17, 1920.

1,356,848. Patented Oct. 26, 1920.

Inventor
A. H. A. Bokelund,
Deceased,
By Hjalmar Bokelund,
Administrator,
By H. R. Kerslake
Attorney.

UNITED STATES PATENT OFFICE.

ALGOT HARALD ALFONSE BOKELUND, DECEASED, LATE OF STOCKHOLM, SWEDEN, BY HJALMAR BOKELUND, ADMINISTRATOR, OF STOCKHOLM, SWEDEN.

BALL-BEARING.

1,356,848.      Specification of Letters Patent.      Patented Oct. 26, 1920.

Application filed May 17, 1920. Serial No. 382,131.

*To all whom it may concern:*

Be it known that ALGOT H. A. BOKELUND, deceased, a subject of the King of Sweden, lately residing at 4 Brunkebergsgatan, Stockholm, Sweden, has invented certain new and useful Improvements in Ball-Bearings, of which the following is a specification.

The present invention relates to ball bearings and more particularly an arrangement applicable to two row axial thrust bearings and to radial ball bearings of the type wherein the outer ball-race of the bearing has an additional external ring keeping the said outer ball-race intact. In the present invention the latter and the external ring bear against each other by means of spherical surfaces with the same or approximately the same center, the additional external ring or the said external ring and the outer ball-race being split in the axial direction of the bearing or obliquely thereto, one of the half-parts of the ring being provided with notches or recesses extending axially or in a direction which is oblique with respect to the axis of the bearing, said notches or recesses meshing with projections or bosses provided in the other half-part of the ring for locking the two halves of the external ring together.

By this arrangement the great advantage of a self-centering bearing is obtained, and at the same time the half-parts of the bearing ring are rigidly kept together.

The invention is characterized by the fact that the notches or bosses bear against one another by means of spherical surfaces with the same or nearly the same center as the curved surface of the outer race ring.

Figure 1:
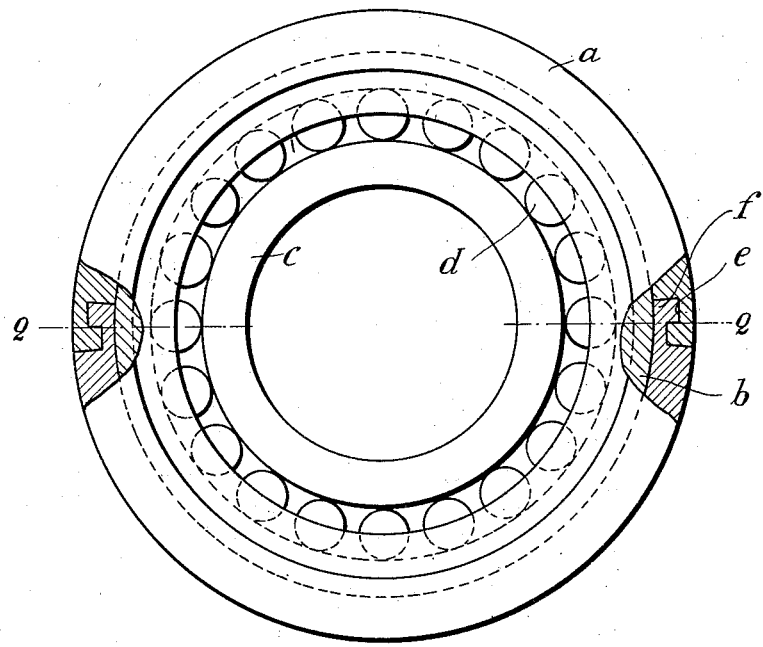
Figure 2:
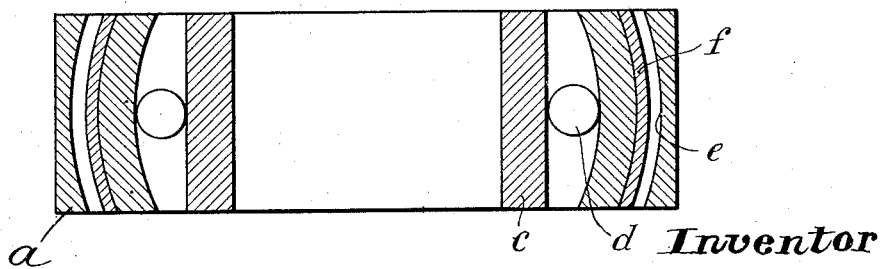

In the accompanying drawing, an embodiment of the invention is shown by way of example, Figure 1 illustrating an elevation of a bearing according to the present invention, while Fig. 2 is a cross section of the same on the line 2—2 in Fig. 1.

*a* denotes the additional external ring and *b* is the outer ball-race, said rings bearing against one another by means of spherical surfaces with the same or nearly the same center.

*c* designates the inner ball-race and *d* the balls.

The additional external ring *a*, or this ring as well as the outer ball-race *b* are split in the axial direction or obliquely thereto in such manner that two half-parts of the ring are formed which keep the bearing together. The one half-part of the ring is in known manner provided with notches or recesses *e* extending in the axial direction of the bearing or obliquely thereto, the said notches or recesses meshing with projections or bosses *f* in the other half-part of the ring. The bosses and notches may enter each other more or less, and they may be of varying width in order to effect a secure retainment of the halves of the ring.

According to the invention, the said bosses or notches bear against each other by means of spherical surfaces of the same or approximately the same center.

What I claim as new and desire to secure by Letters Patent of the United States is:—

In ball bearings, an outer ball-race having an additional external ring for keeping said outer ball-race intact, the latter and the external ring bearing against each other by means of spherical surfaces with the same or approximately the same center, the additional external ring, or the said external ring and the outer ball-race being split in the axial direction of the bearing or obliquely thereto, one end of each of the half-parts of the ring being provided with notches and projections extending axially or in a direction which is oblique with respect to the axis of the bearing, the notches at the ends of each half-part of the ring interlocking with the projections provided in the ends of the other half-part of the ring, said notches and projections having spherical surfaces which bear against each other, and the last named spherical surfaces having approximately the same center.

In testimony whereof I affix my signature in presence of two witnesses.

HJALMAR BOKELUND,
*Administrator of Algot Harald Alfonse Bokelund, deceased.*

Witnesses:
    GUSTAF ALSON,
    S. CH. MALERSON.